(12) United States Patent
Litz et al.

(10) Patent No.: US 6,818,191 B2
(45) Date of Patent: Nov. 16, 2004

(54) AUTOCLAVE CONTROL MECHANISMS FOR PRESSURE OXIDATION OF MOLYBDENITE

(75) Inventors: John E. Litz, Golden, CO (US); Paul B. Queneau, Golden, CO (US); Rong-Chien Wu, Chelmsford, MA (US)

(73) Assignee: H. C. Starck, Inc., Newton, MA (US)

( * ) Notice: Subject to any disclaimer, the term of this patent is extended or adjusted under 35 U.S.C. 154(b) by 33 days.

(21) Appl. No.: 09/851,920

(22) Filed: May 9, 2001

(65) Prior Publication Data

US 2003/0031614 A1 Feb. 13, 2003

(51) Int. Cl.$^7$ ................................................. C22B 3/00
(52) U.S. Cl. ........................ 423/53; 423/27; 423/150.1
(58) Field of Search .............................. 423/53, 55, 27, 423/150.1

(56) References Cited

U.S. PATENT DOCUMENTS

| 3,656,888 A | * | 4/1972 | Barry et al. | |
| 4,512,958 A | * | 4/1985 | Bauer et al. | ................... 423/55 |
| 5,804,151 A | * | 9/1998 | Sweetser et al. | .............. 423/58 |

\* cited by examiner

*Primary Examiner*—Steven Bos
(74) *Attorney, Agent, or Firm*—Joseph C. Gil; James R. Franks

(57) ABSTRACT

The process chemistry during the oxidation of molybdenite concentrates in an oxygen pressure leach can be controlled by regulating the amount of ferric iron and excess sulfuric acid recycled as autoclave discharge slurry or filtrate to the autoclave feed. A computer model capable of predicting the concentration of soluble molybdenum in the autoclave discharge and based on the concentrate and recycle analyses was developed.

11 Claims, 5 Drawing Sheets

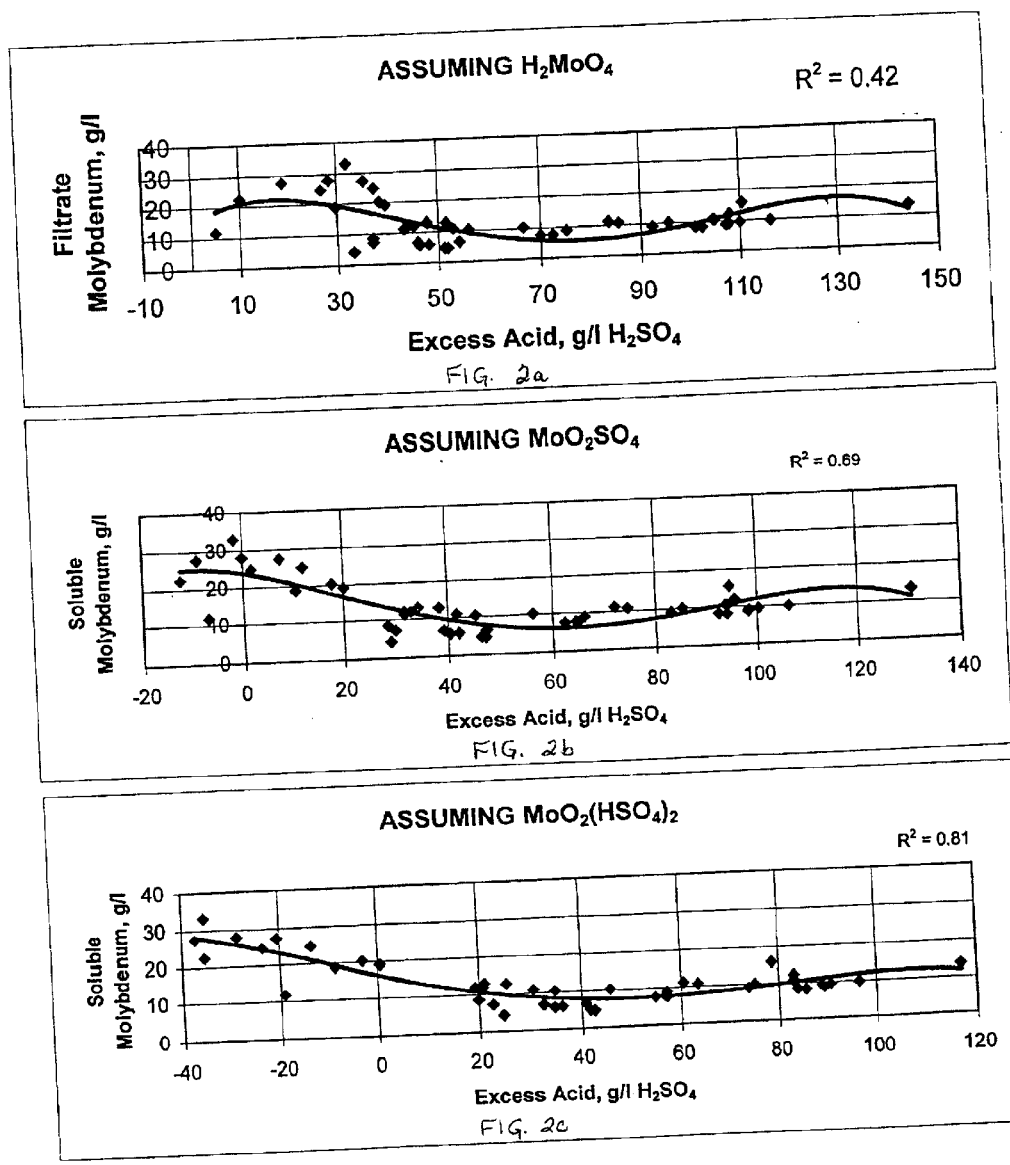

MODEL TO PREDICT SOLUBLE MOLYBDENUM AFTER PRESSURE OXIDATION OF MOLYBDENITE

Concentrate and recycle entries are moles added per liter of initial autoclave slurry.

Concentrate

| | |
|---|---|
| Moles Mo ("A") | 0 |
| Moles Cu ("B") | 0 |
| Moles Fe ("C") | 0 |

Net acid from concentrate, mol/l ("H")   0.000

Recycle Solution

| | |
|---|---|
| Moles Mo ("D") | 0 |
| Moles Cu ("E") | 0 |
| Moles Fe ("F") | 0 |
| Moles H2SO4 ("G") | 0 |

Excess acid, mol/l ("I")   0.00
Gross initial acid, mol/l ("J")   0.00
Predicted g/l Fe ("K")   0.00

Initial prediction, Mo g/l ("L")   22.59

| | |
|---|---|
| If all MoS2 soluble, g/l Mo ("M") | 0 |
| Mo from MoS2 precipitated, g/l ("N") | -22.59 |
| Percent precipitated ("O") | #DIV/0! |
| Acid from addl pptn, mol/l ("P") | #DIV/0! |
| Gross excess acid, mol/l ("Q") | #DIV/0! |
| Final predicted Mo g/l ("R") | #DIV/0! |
| Corrected so solubility does not exceed "M", "S" | #DIV/0! |

Formulae used in calculations

| | |
|---|---|
| "H" | - ("B" * 3) - (("C" - "B") * 0.5) + ("A" * 0.2 * 2) + ("C" * 0.3 * 3) |
| "I" | ("G" + ((3 * "D") - (2 * "E") - (3 * "F")) / 2) |
| "J" | "I" + "H" |
| "K" | (("C" * 0.7) + "F") * 55.85 |
| "L" | (-10.369 * ("J" ^ 3)) + (38.992 * ("J" ^ 2)) + (-46.065 * "J") + 25.892 + ("K" / 3) - 3.3 |
| "M" | "96 * "A" |
| "N" | "M" - "L" |
| "O" | "N" / "M" |
| "P" | ("O" - 0.2) * (A * 4 / 2) |
| "Q" | "I" + "C" + "P" |
| "R" | (-10.369 * ("Q" ^ 3)) + (38.992 * ("Q" ^ 2)) - (46.065 * "Q") + 25.892 + ("K" / 3) - 3.3 |
| "S" | If("R" > "M", "M", "R") |

Note: Functions in the equations are spreadsheet style, i.e., * is times, / is divide, ^ to the power

FIG. 4

AUTOCLAVE CONTROL MECHANISMS FOR PRESSURE OXIDATION OF MOLYBDENITE

FIELD OF THE INVENTION

The present invention relates to the process chemistry during pressure oxidation of molybdenite concentrates and more particularly to a process for controlling and optimizing the process chemistry during the pressure oxidation of molybdenite concentrates.

BACKGROUND OF THE INVENTION

Extraction of molybdenum from molybdenite-containing materials by an aqueous process has been the subject of study for almost 50 years. In 1952, E. S. Usataya[1] reported on the oxidation of molybdenite in water solutions. He found that in neutral, acidic, or weakly alkaline solutions the decomposition products precipitate on the molybdenite surface and protect the molybdenite from further oxidation. He found that strong bases and strong oxidizing agents impede the formation of the protective layers. Increasing temperature accelerated the oxidation rate in alkaline solutions, but up to 60° C. had no effect in acidic solutions.

[1]Usataya, E. S., "Oxidation of molybdenite in water solutions," Zapiski Vsesoyuz Mineral Obshschestva, v 81, 298–303 (1952).

A Japanese patent[2] was issued for oxygen pressure oxidation (POX) of molybdenite in 1962. The example in this patent leached a 55.5% Mo, 36.4% S, and 4.4% Cu concentrate at 9% solids at 200° C. and 200 atmospheres oxygen. The molybdic acid precipitate that formed during leaching was dissolved using ammonia for recovery of an ammonium molybdate. The reaction formula was:

$$2\ MoS_2 + 6H_2O + 9O_2 \rightarrow 2H_2MoO_4\downarrow + 4H_2SO_4 \qquad 1)$$

[2]Sada, Koji, "Extraction of molybdenum," Japanese patent 15.207('62), assigned to Awamura Mining Co., Ltd.

In 1971, AMAX patented similar reactions[3] but chose a temperature greater than 80° C. and a pressure greater than 3.5 atmospheres. In a second AMAX patent[4], alkali hydroxide or ammonium hydroxide was added continuously to neutralize the acid as it formed and maintain the pH at 7–12.

[3]Barry, Henry F. et al, "Aqueous phase oxidation of molybdenum disulfide," German patent 2,043,874 (1971).
[4]Hallada, Callvin J., et al., "Conversion of molybdenum disulfide to molybdenum oxide," German patent 2,045,308 (1971).

Mel'nikov[5] in 1970 and K. Ya. Shapiro et al.[6] in 1973 reported on pressure oxidation in the presence of sulfuric acid. Shapiro postulated the soluble molybdenum species as $MoO_2SO_4$. Mel'nikov used an oxidized concentrate containing 17% Mo and 15% Fe, at 16% solids and 100° C. Shapiro's conditions for a 47% Mo concentrate were 9% solids, 225° C., and less than 10 atmospheres oxygen pressure, for three hours.

[5]Shapiro, K. Ya, et al., "Sulfuric acid processing of oxidized molybdenum raw materials," Nauk. Tr. Vses. Nauch.-Issled. Proekt. Inst. Tugoplavkikh Metal. Tverd. Splavov, 1970.
[6]Mel'nikov, B. S. et al., "Oxidative water-autoclave leaching of molybdenum concentrate," Nauchn Tr., Vses. Nauchno-Issled. Proektn. Inst. (1973) 14, 251–157.

A 1970 paper by Irkov[7] reports the solubility of molybdic oxide in sulfuric acid solutions at 22, 50, 71, and 89° C. The paper shows molybdenum solubility decreasing with increasing temperature and the effect of acid concentrations above 20 percent.

[7]Irkov, F. Ya, Palant, A. A., and Reznichenko, V. A., "Solubility of anhydrous molybdenum (VI) oxide in aqueous solutions of sulfuric acid," Russian Journal of Inorganic Chemistry, v 15, 5, 695–697 (1970).

A 1975 paper by Shapiro and B. S. Mel'nikov[8] reports on POX decomposition studies of 1) pure molybdenite, 99.5% $MoS_2$, 2) high grade concentrate, 47% Mo, and 3) a low grade industrial product containing 16% Mo and 15% Fe. The leaching conditions were 9% solids, less than 160 to 225° C., 5 to 20 atmospheres oxygen overpressure, and 15 to 195 minutes.

[8]Mel'nikov, B. S. and Shapiro, K. A., "Water-autoclave decomposition of molybdenite raw material," Protsessy Poluch. Rafinirovaniya Tugoplavkikh Met. (1975) 113–120, 253–260.

The paper shows the effect of temperature on the oxidation rate with 15 atmospheres oxygen overpressure. The oxidation rate was rapid above 190° C. The paper also shows the effect of oxygen overpressure on the oxidation rate at 225° C. The oxidation rate was directly proportional to the oxygen overpressure. The authors postulate that the oxidation rate as affected by temperature and oxygen overpressure controls the amount of soluble molybdenum.

The paper also includes the effect of adding iron to the high grade molybdenite. The addition of iron greatly accelerates the oxidation of the molybdenite. The temperature effect on the rate is less with the added iron. With iron present, the molybdenum in solution reaches a peak near the 60% molybdenite oxidation point and then decreases to a level about twice that with no iron added. The authors postulate the formation of a molybdenum-iron heteropoly complex that decomposes as the acid concentration increases. It also may be a ferrous complex that decomposes as the soluble iron is oxidized to ferric.

Oxidation of the low-grade industrial-grade concentrate was also studied and the effect of temperature (150–225° C.) on the rate of oxidation, the solubility of molybdenum, the iron and sulfuric acid concentrations at less than 15 atmospheres oxygen overpressure is shown. The data clearly illustrate an incubation period while sufficient pyrite/chalcopyrite is oxidized to generate sufficient sulfuric acid to begin the molybdenite oxidation. Rapid oxidation of the molybdenite did not occur until the soluble iron was about 8 g/l and the sulfuric acid concentration was about 40 g/l. The data indicate that batch testing using water as the lixiviant would not produce data that could be translated to a continuous reactor.

Rothmann[9] in 1980 and Bauer[10] in 1984 patented an oxygen pressure leaching processes in which molybdenite was added to a reacted mixture containing up to 100 g/l sulfuric acid. The leaching was done at 250 to 300° C. and 10 to 20 atmospheres-oxygen overpressure.

[9]Rothmann, Hans W. and Bauer, Guenter, "Method for recovering molybdenum oxide," German patent DE 2,830,394 (1980).
[10]Bauer, Guenter and Eckert, Joachim, "Recovery of molybdenum oxide," German patent DE 3,128,921 (1983).

In 1986, Gock[11] patented the oxidation of molybdenite (97.5%) while not completely oxidizing the contained flotation reagents. This would keep the molybdenum as soluble, reduced-valence species, not hexavalent species that would precipitate. The conditions (acid lixiviant of 0.2 to 0.6 pH, 160–220° C., and oxygen overpressure) do not indicate how the reaction control can prevent complete oxidation of the flotation reagents.

[11]Gock, Eberhard, "Pure molybdenum trioxide produced by way of extraction of molybdenum from sulfate solutions," German patent DE 84 3,443,806 (1986).

In 1998, Cyprus Amax[12] patented a process in which molybdenite is added to the filtrate from a prior reaction and allowed to react to 70 to 95% oxidation. Unreacted molybdenite is recovered from the solids by froth flotation. The unreacted molybdenite and some residual liquid are recycled to the leaching reactor. Oxidation conditions are 175–225° C. and 50 to 300 psig oxygen overpressure. The flotation tails, molybdic oxide and/or molybdic acid also contain a small amount of molybdenite and must be calcined prior to sale as molybdic oxide. The balance of the residual liquid from the autoclave is treated for recovery of rhenium and copper.

[12]W. H. Sweetser and L. N. Hill, "Process for autoclaving molybdenum sulfide," U.S. Pat. No. 5,804,151 (1998).

A Canadian patent by Brassier and Pascal[13] followed the formation of heteropoly compounds when leaching crude calcium molybdate precipitates with sulfuric acid. The data in this patent indicated significant formation of heteropoly phosphates and silicates when leaching was done at less than 0.5 molar sulfuric acid (49 g/l). When leaching was done at 1 molar sulfuric acid, the quantities of heteropolys were reduced by more than one order of magnitude. The inference from these data is that the initial leach feed must contain sufficient free acid to avoid the low acid range where the heteropolys form.

[13]Brassier, Cecile and Baron, Pascal: Canadian Patent 2, 154,133 (1996) also French Patent 2,272,701. "Process for the recovery of molybdenum from impure calcium molybdate resulting from the treatment of uraniferous ores"

It is clear from the various processes, conditions, and theories used over the years that a fundamental understanding of the process chemistry involved in oxidation of molybdenite concentrates is still needed in order to reliably control the chemical reactions in an oxygen pressure leach and to predict the concentration of soluble molybdenum present in the autoclave discharge slurries after pressure oxidation.

It is therefore an object of the present invention to provide a leaching model which predicts the amount of soluble molybdenum present in the autoclave discharge slurries after the pressure oxidation of molybdenite concentrates.

It is a further object of the present invention to provide a process for optimizing and controlling the process chemistry during the pressure oxidation of molybdenite concentrates.

SUMMARY OF THE INVENTION

The objects set forth above as well as further and other objects and advantages of the present invention are achieved by the embodiments of the invention described hereinbelow.

The present invention provides a leaching model which predicts the amount of soluble molybdenum present during the pressure oxidation of molybdenite concentrates and provides a process for optimizing and controlling the process chemistry during the pressure oxidation in the autoclave.

The process chemistry during the pressure oxidation of molybdenite concentrates is controlled, to enhance recovery in accordance with the present invention, by regulating the amount of ferric iron and excess sulfuric acid in the final leach slurry. The oxidation kinetics are controlled by the temperature and oxygen overpressure used in the autoclave. The model predicts the soluble molybdenum based on the concentrate analysis, the recycle solution analysis, and the pulp density used. Good oxidation kinetics were found to require temperatures greater than 200° C. and greater than 50 psig oxygen overpressure.

The model is able to determine conditions of molybdenum solubility independent of molybdenum oxidation. Using the computer model, greater than 99% oxidation of the molybdenite was achieved while producing a final slurry where less than 20% or more than 80% of the molybdenum was soluble. Dissolution of the copper content was greater than 99% and dissolution of the iron was 60 to 90% from the pyrite and chalcopyrite present in the concentrate. Substantial quantities of this iron could then precipitate as iron molybdate. By leaching under high excess acid conditions, the amount of soluble silicon could be held under 100 mg/l. Most of the rhenium, arsenic, and phosphorus were dissolved regardless of the leaching conditions.

Other objects, features and advantages of the invention will be apparent from the following description of preferred embodiments thereof, including illustrative non-limiting examples, of the modeling process and the resulting product composition.

BRIEF DESCRIPTION OF THE DRAWINGS

FIGS. 2a–2c are graphs of the soluble molybdenum concentration for three different species versus the excess sulfuric acid concentration;

FIG. 4 is the leaching model created to predict the soluble molybdenum after pressure oxidation of molybdenite concentrates.

DETAILED DESCRIPTION OF PREFERRED EMBODIMENTS

Figure 1A:
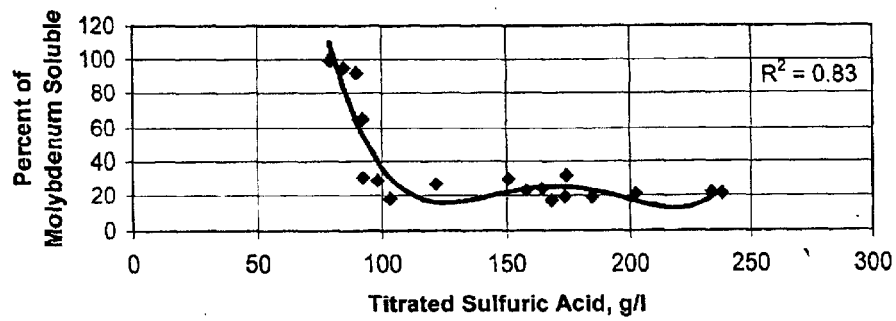
FIG. 1a is a graph of the soluble molybdenum concentration versus the titrated sulfuric acid concentration.
Figure 1B:
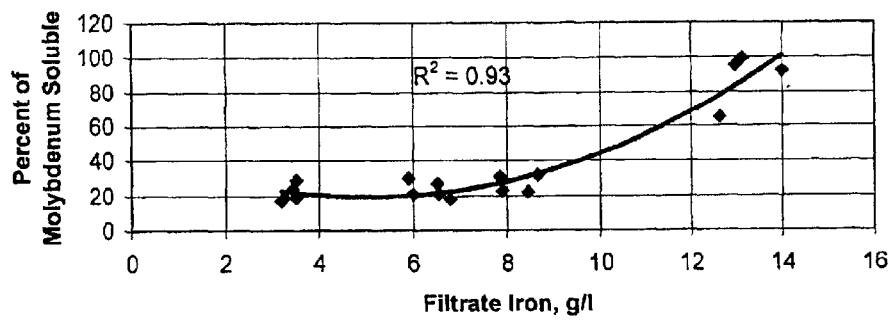
FIG. 1b is a graph of the soluble molybdenum concentration versus the ferric iron concentration.
Figure 1C:
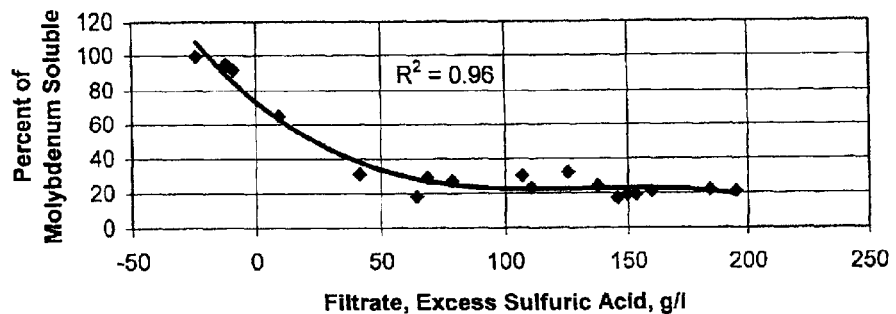
FIG. 1c is a graph of the soluble molybdenum concentration versus the ferric iron plus excess sulfuric acid concentration.

A leaching model capable of predicting the concentration of soluble molybdenum was created after a series of laboratory pressure leaching tests were performed and sufficient statistical data were collected. The data indicated that leaching temperature, time, and oxygen overpressure did not significantly affect the molybdenum solubility. The significant variables were the final acid and iron concentrations. FIGS. 1a, 1b, and 1c show the effect of these variables on the molybdenum solubility. In FIG. 1a, the decreasing molybdenum solubility shows good correlation with the increasing titrated sulfuric acid values. In FIG. 1b, the increasing molybdenum solubility shows good correlation with the increasing iron concentration. In FIG. 1c, the molybdenum solubility fit to the model (iron plus excess acid concentration) shows excellent correlation ($R^2$=0.96).

The first step in developing the model was to determine what species were present in the leach solution and how to quantify the acid concentration. High sulfate concentrations in the leach solution favor bisulfate anions being in equilibrium with the metal cations. Therefore the modeling process assumed that the iron and copper were soluble as $Fe(HSO_4)_3$ and $Cu(HSO_4)_2$. The Russian work (Shapiro and Mel'nikov) had assumed the soluble molybdenum species was $MoO_2SO_4$. FIGS. 2a–2c plot the soluble molybdenum concentration as three different species ($H_2MoO_4$, $MoO_2SO_4$, and $MoO_2(HSO_4)_2$ versus the excess acid. Only the tests with good sulfide oxidation and good metal balances were used in these plots. When assuming the specie as $MoO_2(HSO_4)_2$, the fit of the molybdenum concentration to the excess acid shows better correlation with an $R^2$ value of 0.81.

The control model is based on predicting the final (excess) acid concentration and soluble iron concentrations. Excess acid is defined as the titrated acid value corrected for the bisulfate that titrates with the acid species plus any acid generated by the titration procedure. The titration procedure used during the laboratory program begins by diluting the aliquot to be measured with a potassium oxalate solution. The cations then complex with oxalate, freeing the bisulfate to be titrated with potassium hydroxide. Essentially the titration chemistry is as follows:

$$2Fe(HSO_4)_3 + 3K_2C_2O_4 \rightarrow Fe_2(C_2O_4)_3 + 6K^+ + 6HSO_4^- \quad \quad 2)$$

$$Cu(HSO_4)_2 + K_2C_2O_4 + K_2C_2O_4 \rightarrow CuC_2O_4 + 2K^+ + 2HSO_4^- \quad \quad 3)$$

$$MoO_2(HSO_4)_2 + K_2C_2O_4 + H_2O \rightarrow K_2MoO_3C_2O_4 + 2H^+ + 2HSO_4^- \quad \quad 4)$$

When the above ions are titrated with KOH, the reactions are:

$$K^+ + HSO_4^- + KOH \rightarrow 2K^+ + SO_4^{-H}{}_2O \quad \quad 5)$$

$$2H^+ + 2HSO_4^- + 4KOH \rightarrow 4K^+ + 2SO_4^- + 2H_2O \quad \quad 6)$$

Figure 3:
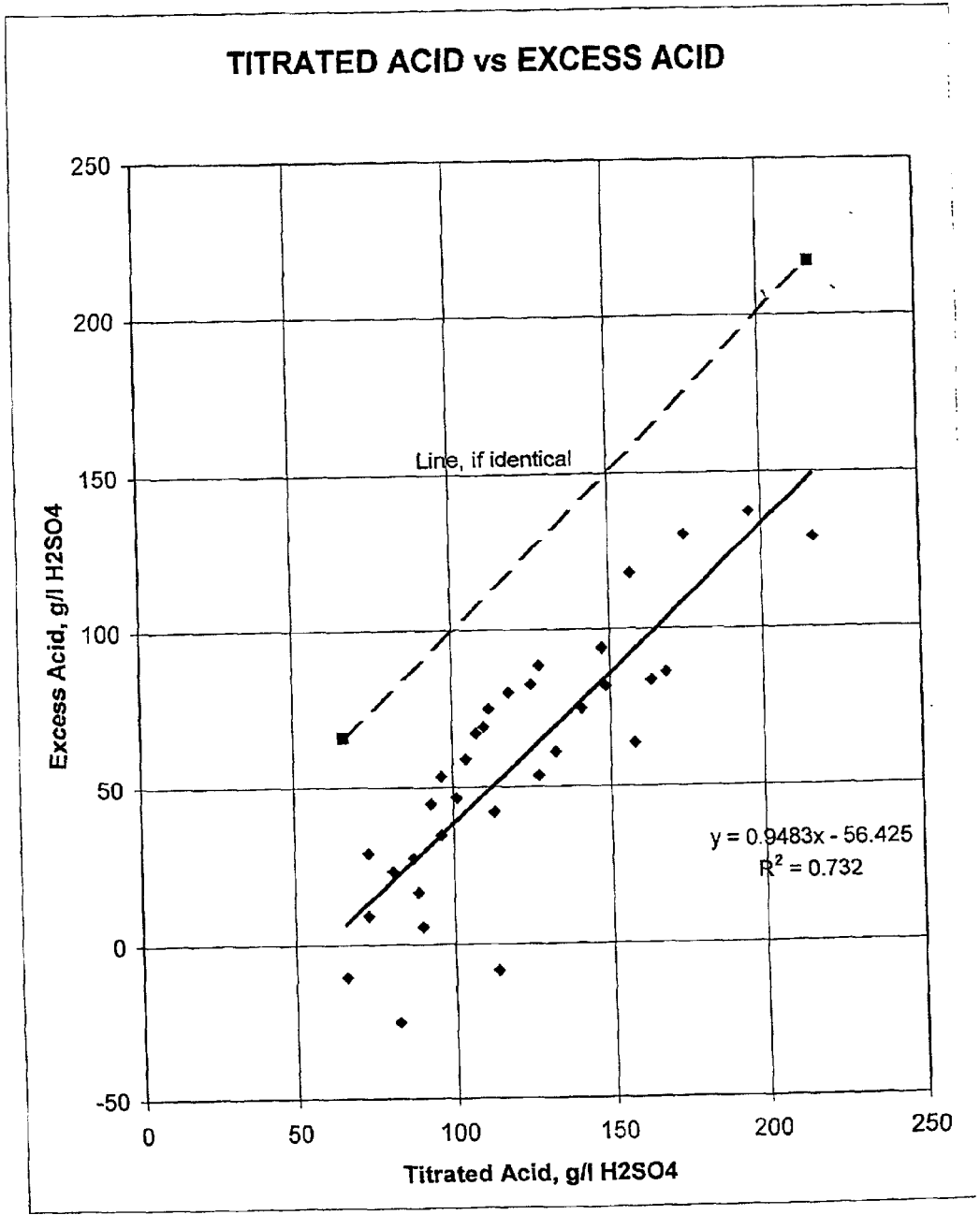
FIG. 3 is a graph of the calculated excess sulfuric acid concentration versus the titrated sulfuric acid concentration for filtrates taken from batch-continuous tests.

Therefore, the titration accounts for two bisulfate ions associated with each copper ion, three bisulfate ions associated with each ferric ion, and two bisulfate ions and two hydrogen ions associated with each molybdenum ion. After correcting the titrated acid for the bisulfate and hydrogen ions associated with the copper, iron, and molybdenum, the remaining acid is referred to as "excess acid". FIG. 3 shows the good correlation of the titrated sulfuric acid value to the calculated "excess acid".

An equation then was built to predict the amount of excess acid from the concentrate weight and analysis plus the recycled solution volume and analysis. The assumed reactions are:

$$2MoS_2 + 9O_2 + 2H_2O \rightarrow 2MoO_2(HSO_4)_2 \quad \quad 7)$$

$$4CuFeS_2 + 12H_2SO_4 + 17O_2 \rightarrow 4Cu(HSO_4)_2 + 4Fe(HSO_4)_3 + 2H_2O \quad \quad 8)$$

$$4FeS_2 + 4H_2SO_4 + 15O_2 + 2H_2O \rightarrow 4Fe(HSO_4)_3 \quad \quad 9)$$

Other mineral sulfides also react and form soluble bisulfates. In this instance, lead probably would precipitate as a sulfate.

Note that none of the above reactions generate any excess acid. The chalcopyrite and pyrite actually are acid consumers. The copper and iron dissolve rapidly at the autoclave conditions and later some of the iron, 15 to 25%, precipitates as $Fe_2O_3$. Ultimately some of the molybdenum hydrolyzes, generating acid. Following are the primary precipitation reactions.

$$2Fe(HSO_4)_3 + 3H_2O \rightarrow Fe_2O_3 \downarrow + 6H^+ + 6HSO_4^- \quad \quad 10)$$

$$MoO_2(HSO_4)_2 + 2H_2O \rightarrow (H_2MoO_4 \downarrow \text{ or } H_2O + MoO_3 \downarrow) + 2H^+ + 2HSO_4^- \quad \quad 11)$$

Once the iron and/or molybdenum begin to precipitate, the excess acid level increases rapidly causing more molybdenum to precipitate. Estimating the amount of iron that precipitates is important to predicting the amount of molybdenum that will precipitate.

Figure 5:
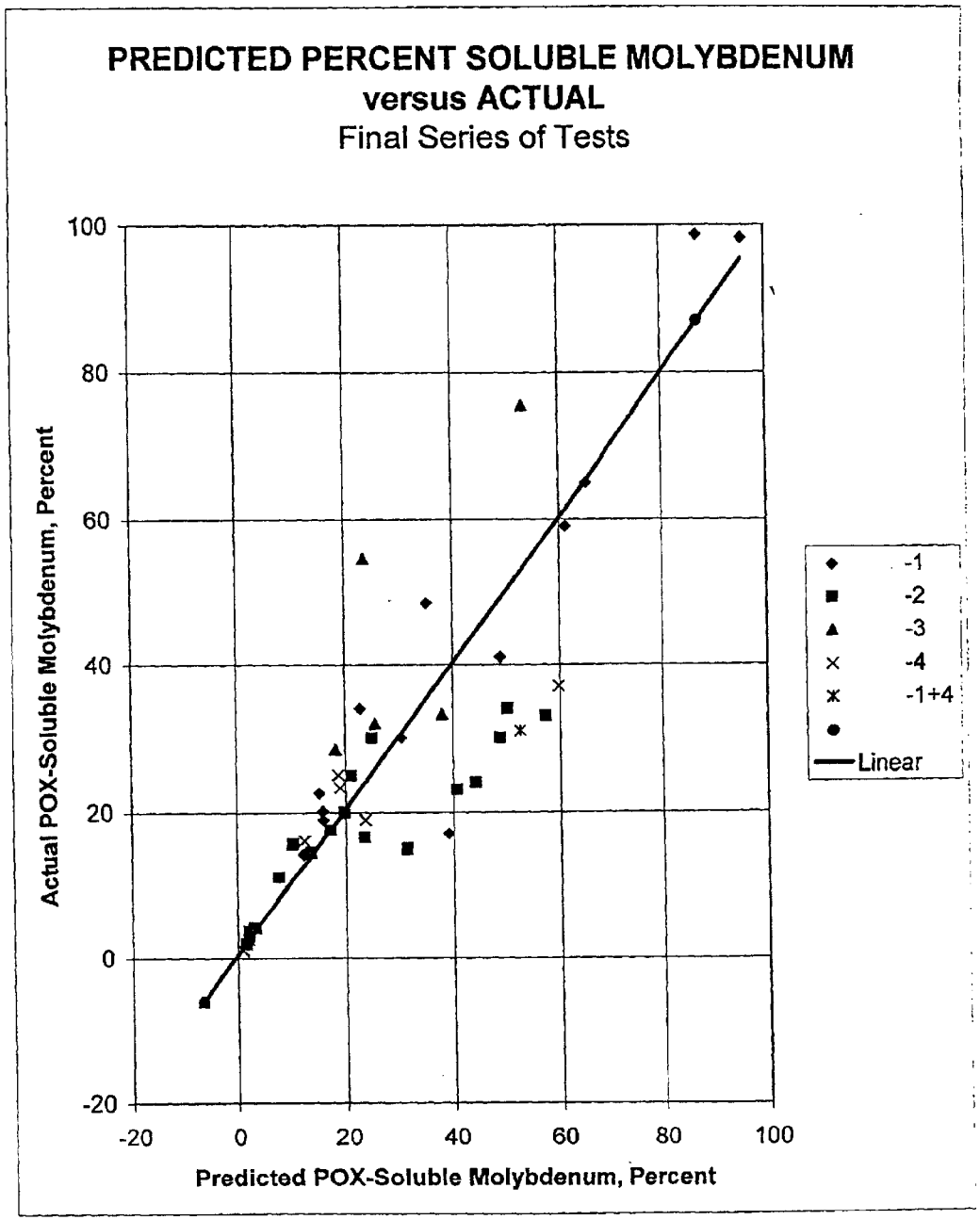
FIG. 5 is a graph of the actual POX-soluble molybdenum versus the model predicted POX-soluble molybdenum.

FIG. 4 shows the model created to predict the soluble molybdenum after pressure oxidation of molybdenite concentrates. The model philosophy is based on a preliminary calculation to estimate the excess acid followed by a second calculation that uses the estimated excess acid. The first calculation is an estimation of the excess acid assuming: 1) complete dissolution of the copper, iron, and molybdenum in the concentrate feed; 2) precipitation of 30% of the iron including, both that recycled and dissolved from the concentrate; and 3) precipitation of all the recycled molybdenum plus 20% of that dissolved from the concentrate. The 30% iron precipitation value is an average when the leaching tests are run at 200–220° C. At higher temperatures, more of the iron would precipitate. The 20% molybdenum was selected to avoid dealing with large negative values for cases where the model would predict high molybdenum solubility. This excess acid value plus a correction for the estimated soluble iron is used to calculate an initial prediction of the soluble molybdenum. The excess acid value then is corrected to compensate for the amount of additional molybdenum precipitated, and a final prediction is made. FIG. 5 compares the model-predicted soluble molybdenum versus the actual soluble molybdenum. Note that if the model were perfect all points would fall on the line drawn through data. Experimental and analytical errors probably contribute to the variability of the points following the model's predicted line.

The principal advantages of understanding the process chemistry are the ability to control the chemical reactions involved and predict the amount of soluble molybdenum in the autoclave discharge. However, this understanding has also contributed to other process improvements such as producing lower soluble silicon levels when the free acid in the autoclave is controlled at a relatively high level. Another improvement discovered was recycling the leach slurry with its content of free acid and ferric iron increases the initial rate of reaction such that a shorter retention time is required for the leach, reducing the size of the process equipment.

EXAMPLES

The invention is now further disclosed with reference to the following non-limiting Examples. The leaching studies were done using either a batch-continuous or a batch procedure. The batch-continuous procedure more closely simulates a continuous autoclave and allows for faster reaction rates. Identical results were achieved with batch procedures as long as the retention time was sufficient.

Example 1

Batch-continuous Leaching Procedure

1. Charge the 2-liter Parr reactor with a design volume of slurry (nominally 1-liter), heat to temperature under oxygen pressure and leach for 30 minutes. Foaming was a problem when a continuous flow of oxygen was used. Therefore, a procedure was developed to depressurize by one-half the oxygen overpressure every 15 minutes and then add oxygen until the desired overpressure was reached. This allowed for any foam that formed to re-entrain in the slurry. When a draft-tube upper impeller was used, it was possible to continuously add oxygen and vent vapor space.
2. Discharge one-half of the slurry volume (Slurry A) and replace with fresh slurry.
3. Leach for 30 minutes.
4. Discharge one-half of the slurry volume (Slurry B) and replace with fresh slurry.
5. Leach for 30 minutes.
6. Discharge one-half of the slurry volume (Slurry C) and replace with fresh slurry.
7. Leach for 30 minutes, then take a small aliquot of slurry for analysis (Slurry D).
8. Leach an additional 30 minutes, then take a small aliquot of slurry for analysis (Slurry E).
9. Leach an additional 30 minutes, then take a small aliquot of slurry for analysis (Slurry F) and cool the reactor. Filter and rinse the solids (Slurry G).

10. Age all autoclave interval and discharge samples with mixing for at least 120 minutes in a 35° C. water bath. This allows the samples to come to equilibrium at conditions that are practical in a commercial plant. After aging to reach equilibrium filter all samples and wash with water. The filtrates and washes are combined for analysis. Most of the terminal samples were filtered, washed, repulped, refiltered and rewashed to minimize the carry forward of soluble sulfate in the filter cake.

11. The final filtrates from the autoclave were analyzed for the major constituents and some trace elements. The washed acid residue was split in half or into smaller portions. Up to one-half was dried and analyzed, and up to one-half was leached with sodium carbonate solution.

12. The washed residue was leached with 18% sodium carbonate solution at 50° C. to dissolve the balance of the oxidized molybdenum and precipitated sulfates. The sodium carbonate residue was analyzed for residual sulfide and total (insoluble) molybdenum.

Example 2

Batch Leaching Procedure

Batch leaching tests were performed in 2-liter and 2-gallon Parr reactors. The concentrate was pulped in the reactor using recycle solutions plus water. The reactor was sealed and brought to temperature under oxygen pressure. The reactor was held at the desired temperature for 150 minutes. When the 2-liter reactor was used, the oxygen partial pressure was controlled during the leach by bleeding about one-half of the overpressure every fifteen minutes, then adding oxygen until the desired overpressure was reached. When a draft-tube upper impeller was used, it was possible to continuously add oxygen and vent the vapor space. When the 2-gallon reactor was used foaming was not a problem, oxygen was added continuously and the vapor space was vented continuously.

Table 1 compares the predicted and actual soluble molybdenum values for tests using four samples.

TABLE 1

Examples of using leaching model to generate autoclave products with high and low molybdenum solubility

|  | Concentrate 1 | | Concentrate 2 | | Concentrate 3 | | Concentrate 4 | |
| --- | --- | --- | --- | --- | --- | --- | --- | --- |
| Concentrate analysis | | | | | | | | |
| Copper, % | 3.8 | | 2.1 | | 2.0 | | 7.2 | |
| Molybdenum, % | 12.8 | | 22.3 | | 22.8 | | 26.9 | |
| Iron, % | 4.0 | | 2.3 | | 2.2 | | 6.9 | |
| Sulfur, % | 12.4 | | 17.2 | | 18.1 | | 25.8 | |
| Target Molybdenum Solubility | High | Low | High | Low | High | Low | High | Low |
| Test No: | 134 | 102 | 43 | 109 | 137 | 70 | 47 | 67 |
| Charge to leach | | | | | | | | |
| Concentrate, grams | 184 | 230 | 119 | 140 | 141 | 179 | 96 | 96 |
| Cu recycled, mol/mol Mo | 0.00 | 0.2 | 0.00 | 0.12 | 0.42 | 0.04 | 0.00 | 0.23 |
| Fe recycled, mol/mol Mo | 0.39 | 0.22 | 0.79 | 0.13 | 0.5 | 0.17 | 0.57 | 0.56 |
| $H_2SO_4$ recycled or added, by titration mol/mol Mo | 0.43 | 1.94 | 0.46 | 1.48 | 2.72 | 0.71 | 0.47 | 5.2 |
| $H_2SO_4$ excess, mol/mol Mo | −0.04 | 0.52 | −0.31 | 0.41 | 0.41 | 0.21 | −0.23 | 1.34 |
| Autoclave discharge | | | | | | | | |
| Predicted g/l Mo | 23.8 | 10.3 | 25.4 | 7.3 | 13.4 | 8.4 | 25.2 | 9.6 |
| Actual g/l Mo | 27.3 | 10.1 | 28.5 | 6.3 | 19.1 | 10.1 | 25.6 | 14.1 |
| Actual g/l Cu | 7.1 | 16.6 | 2.6 | 5.6 | 10.8 | 5.1 | 6.8 | 13.2 |
| Actual g/l Fe | 11.6 | 11.7 | 14 | 5.1 | 12.5 | 7.6 | 13 | 17.1 |
| Free $H_2SO_4$ by titration, g/l | 77 | 144 | 90 | 117 | 89 | 93 | 85 | 158 |
| Excess $H_2SO_4$, g/l | −20 | 67 | −9 | 82 | 1 | 45 | −12 | 64 |
| Residue analyses | | | | | | | | |
| Sulfur, % after $Na_2CO_3$ leach | 0.61 | 0.02 | 0.41 | 0.27 | 0.36 | 0.1 | 0.49 | 0.1 |
| Molybdenum, % | 0.3 | 16 | 2.2 | 28.6 | 5.9 | 25 | 1.7 | 41.4 |
| Molybdenum, % after $Na_2CO_3$ leach | 0.15 | 0.04 | 0.1 | 0.43 | 0.6 | 0.17 | 0.5 | 0.3 |
| Leach Efficiency | | | | | | | | |
| Sulfide Oxidation, % | 99 | 96.8 | 96.5 | 98.6 | 97.5 | 99.5 | 98.3 | 99.9 |
| Molybdenum soluble in leach, % | 98.8 | 9 | 92 | 10 | 75 | 21 | 95 | 10 |
| Molybdenum, total oxidized % | 99.9 | 99 | 99.8 | 99 | 98 | 99.7 | 98.5 | 99.4 |

Example 3

Effect of Low Mo Solubility Conditions on Soluble Silicon

The silicon values in leach solutions from tests targeting low molybdenum solubility were much lower than observed in earlier tests where acid control was not practiced. Table 2 below compares these silicon analyses from low molybdenum solubility tests with the ranges of silicon analyses observed in all tests. The low silicon values probably can be attributed to recycling high-acid and low-silicon content leach solutions to the autoclave, e.g., an equilibrium leach feed.

TABLE 2

| Concentrate | Concentrate 2 | Concentrate 4 |
| --- | --- | --- |
| Molybdenum (g/l) | 9.9 | 9.3 |
| Soluble Molybdenum (%) | 11 | 16 |
| Silicon (mg/l) | 64 | 96 |

What is claimed is:

1. A method of optimizing the oxidation of molybdenite concentrates comprising:
   a. forming an aqueous slurry of said molybdenite concentrates;
   b. heating said slurry to a temperature of at least about 200° C.;
   c. agitating said slurry while in contact with an atmosphere containing free oxygen;
   d. oxidizing said slurry in said atmosphere at an oxygen over pressure of at least about 50 p.s.i.;
   e. regulating an amount of ferric iron concentration and excess sulfuric acid concentration during the oxidation reaction; and thereby
   f. producing a leach slurry wherein greater than about 99% of the molybdenum in said molybdenite concentrate is oxidized.

2. The method of claim 1 wherein less than about 20% or greater than about 80% of said oxidized molybdenum is soluble.

3. The method of claim 1 wherein said molybdenite concentrates contain copper and the copper dissolution is greater than about 99% in said leach slurry.

4. The method of claim 1 wherein said molybdenite concentrates contain iron and the iron dissolution is about 60–90% by weight in said leach slurry.

5. The method of claim 1 wherein the regulating step maintains said slurry in a high excess sulfuric acid level sufficient to produce lower soluble silicon levels.

6. The method of claim 1 wherein the regulating step maintains said slurry in a high ferric iron level sufficient to accelerate the rate of oxidation.

7. The method of claim 1 further comprising recycling a portion of said leach slurry produced in step (f) back to the forming step (a).

8. The method of claim 7 further comprising determining an approximation of the amount of soluble molybdenum in the leach slurry.

9. The method of claim 8 wherein the determining step includes monitoring a concentrate analysis, a recycling solution analysis, and pulp density.

10. The method of claim 1 wherein the oxygen over pressure in the oxidizing step ranges from about 80 to about 120 p.s.i.

11. The method of claim 1 wherein the temperature in the heating step ranges from about 210 to about 220° C.

* * * * *